United States Patent [19]

Barfuss et al.

[11] Patent Number: 4,541,686

[45] Date of Patent: Sep. 17, 1985

[54] CABLE CONSTRUCTION

[75] Inventors: Jüergen Barfuss; Ulrich Oestreich; Gernot Schoeber; Wolfgang Schrey, all of Munich, Fed. Rep. of Germany

[73] Assignee: Siemens Aktiengesellschaft, Berlin & Munich, Fed. Rep. of Germany

[21] Appl. No.: 488,444

[22] Filed: Apr. 25, 1983

[30] Foreign Application Priority Data

Apr. 30, 1982 [DE] Fed. Rep. of Germany ....... 3216233

[51] Int. Cl.⁴ .......................... G02B 5/16; H01B 7/18
[52] U.S. Cl. ................................ 350/96.23; 174/107
[58] Field of Search ................ 350/96.23; 174/102 R, 174/107

[56] References Cited

U.S. PATENT DOCUMENTS

| | | | |
|---|---|---|---|
| 3,720,994 | 3/1973 | Wagele | 174/107 |
| 3,903,354 | 9/1975 | Dageförde | 174/107 |
| 4,145,567 | 3/1979 | Bahder et al. | 174/107 |
| 4,312,565 | 1/1982 | Oestreich et al. | 350/96.23 |
| 4,327,248 | 4/1982 | Campbell | 174/107 |
| 4,332,976 | 6/1982 | Hawkins | 174/107 |
| 4,360,395 | 11/1982 | Suzuki | 174/107 |

FOREIGN PATENT DOCUMENTS

| | | | |
|---|---|---|---|
| 1232628 | 4/1961 | Fed. Rep. of Germany | 174/107 |
| 2740162 | 3/1979 | Fed. Rep. of Germany. | |
| 2020085 | 11/1979 | United Kingdom. | |
| 2030757 | 4/1980 | United Kingdom | 174/107 |

*Primary Examiner*—William L. Sikes
*Assistant Examiner*—Frank González
*Attorney, Agent, or Firm*—Hill, Van Santen, Steadman & Simpson

[57] ABSTRACT

A cable construction having a cable core of elements saturated with a filling material and surrounded by a barrier film which is surrounded by an outer sheath characterized by the inner surface of the barrier film having sub-areas containing an adhesive material with the remaining sub-areas being free of the adhesive layer. In one embodiment, an armored layer is interposed between the barrier film and the cable core and an outer adhesive layer is interposed between the barrier film and the outer sheath.

17 Claims, 3 Drawing Figures

4,541,686

CABLE CONSTRUCTION

BACKGROUND OF THE INVENTION

The present invention is directed to a cable particularly an optical waveguide cable, having a cable core with a filling compound to produce a longitudinal tightness, which core is surrounded by a barrier or continuing film having sub-areas of the internal surface provided with an adhesive layer with the remaining internal areas being free of the adhesive material and an outer sheath surrounding the barrier or confining film.

A cable, which has a core composed of core elements, which core is surrounded by a confining or barrier film whose inner surface is covered by an adhesive layer and whose outer surface also has an adhesive layer for a surrounding outer sheath, is disclosed in copending U.S. patent application Ser. No. 438,749, filed Nov. 3, 1982, which application was based on German application No. 31 44 851. The confining or barrier film has the purpose of providing a separation, which is as complete as possible, between the core filling compound or material on the one hand and the outer cable sheath on the other hand. In particular, when a barrier layer is non-metallic and nearly randomly ductile and hardly loadable, the non-reinforced sheath will slide under load on the core which is filled with a material such as petrolatum up to its limit of dilatability. It must therefore be guaranteed that this confining or barrier film does not promote sliding of the sheath on the core during drawing or assembling operation but in contrast reduces such sliding. This is particularly the case when no longitudinal reinforcing element, for example, glass threads, are introduced into the outer sheath which threads create the disadvantage of reducing the flexibility of the cable and also the disadvantage of increasing the cost of the cable.

It is known to employ polyamides, polyesters, polyurethane or other thermoplastic or cross-link materials for the confining or barrier film. For the purpose of better adhesion to the outer sheath which usually consists of a polyethylene, the confining or barrier film can be covered on one side such as the outer surface with a meltable adhesive, for example, an adhesive of either an acrylate base or a polyamide base.

SUMMARY OF THE INVENTION

The object of the present invention is to create a cable structure which is particularly simple to manufacture, produces good longitudinal tightness, and at the same time makes reinforcement elements in the sheath superfluous to reduce the flexibility of the cable as little as possible. This is achieved according to the invention by providing an improvement in a cable, particularly an optical waveguide cable, having a cable core with a filling compound to produce longitudinal tightness, a barrier film surrounding the cable core and an outer sheath surrounding the barrier film. The improvement is that the inner surface of the barrier film is divided into sub-areas or surface portions and remaining areas or remaining surface portions with the sub-areas or surface portions containing an adhesive material while the remaining areas or remaining surface portions are free of adhesive material.

If the adhesive material is applied over the entire circumference of the core between the core and the confining or barrier film, then the compensatory movement of the cable core when bending the cable would also be impeded. This would lead to a displacement of the elastic line toward the outside and thus would lead to a crushing of the core. In contrast thereto, the adhesion only in the small sub-areas or surface portions provided according to the present invention does not impede these operations.

According to an advantageous embodiment of the invention, the design is undertaken such that the adhesive layer is applied to the interior surface or sub-areas of the barrier film only in the form of a longitudinal strip and the remaining circumference is kept free of any adhesive material. The sub-area containing the adhesive strip of material thus proceeds largely along the longitudinal axis of the cable in this embodiment.

Another development of the invention is that the sub-areas as well as the adhesive material disposed thereon are distributed as punctiform with a large interval or as longitudinal spaces. The small spot-like areas at the inside surface of the barrier film occur at which a connection between the film and the cable core exists.

Still another development or embodiment of the invention is characterized in that the adhesive material is disposed in annular-shaped sub-areas on the barrier film which sub-areas are disposed at various intervals. In this case, certain areas occurring along the longitudinal axis of the cable are provided in which connections will exist and larger areas are present in which the connection between the core and the barrier film do not occur.

The invention can be employed with particular advantage when an armor layer, for example, a non-yielding winding, is applied to the cable core so that the adhesive layer in the sub-areas produces a connection between the confining or barrier film and this armor layer. In the cases in which the adhesive layer is applied as sub-areas that are punctiform or are annular sub-areas, it is expedient to select the spacing or interval between the sub-areas to be a whole multiple of the length of the lay of the material forming the armor layer.

It is also expedient that the barrier film or layer has a longitudinally extending joint caused by overlapping edges and to provide a retaining helix which extends in the direction of the overlap of the edges to insure the longitudinal tightness of the barrier film. Thus, in manufacture, the confining or barrier film can advantageously be designated as a longitudinally extending film and the retaining helix both holds the film and also presses it against the core and sees to a particularly good seal therewith. The retaining helix is thereby expediently so tightly drawn that it somewhat impresses or crimps the film and the intersections with the inner adhesive strip exhibit a good adhesion. The helical gap potentially occurring under the film is thereby systematically sealed.

A thin, temperature-stable and saturatable yarn or thread can be employed for the retaining helix. An example of such a aramide yarn is sold by duPont under the trademark "KEVLAR". The retaining helix can also be designed as a thin, yield-proof flat band.

It is advantageous when another layer of meltable adhesive is additionally applied to the outer surface of a structure which consists of the barrier film and the applied retaining helix. This additional layer of meltable adhesive expediently saturates and seals the yarn-like retaining helix on the one hand and at the same time causes the adhesion of the film to the outer sheath and also causes adhesion of the overlapped portions of the seam.

DESCRIPTION OF THE PREFERRED EMBODIMENTS

Figure 1:
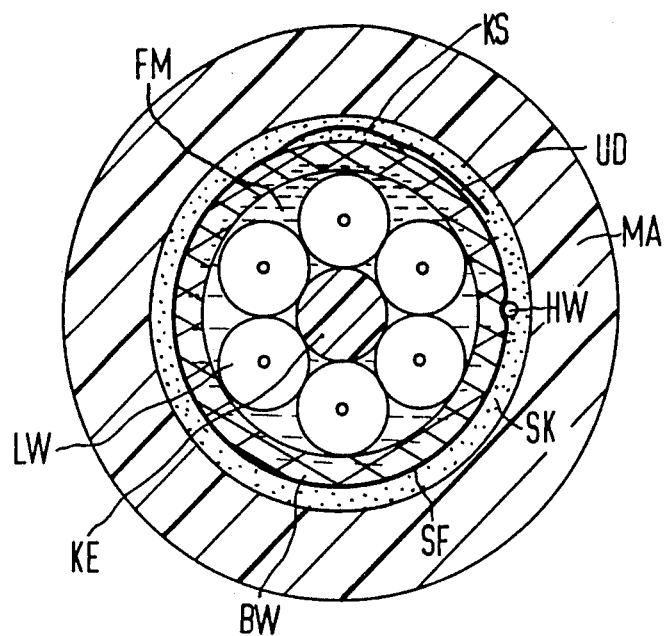
FIG. 1 is a cross-sectional view through a cable in accordance with the present invention.

The principles of the present invention are particularly useful in a cable of FIG. 1. The cable has an outer sheath MA which consists of a hard material such as, for example, polyethylene. In order to keep a filling compound FM which is provided in the cable core to obtain longitudinal tightness from the outer sheath MA, a confining or barrier film SF is provided which has overlapping edges to form an overlap seam or range UD. A narrow adhesive layer KS, which is illustrated as having a strip-like shape, is provided on a sub-area or strip-like portion of the inside surface of the barrier film SF. As illustrated, the adhesive layer KS extends in a longitudinal direction of the cable and only covers a small part of the circumference of the barrier film SF. Since the adhesive layer is applied only on the longitudinal strip on the inner surface of the barrier film, the flexibility of the cable core is not impeded. This is particularly true in comparison to a barrier film which is provided with an adhesive agent over its entire inside surface and is therefore limited to thinner cables.

Figure 2:
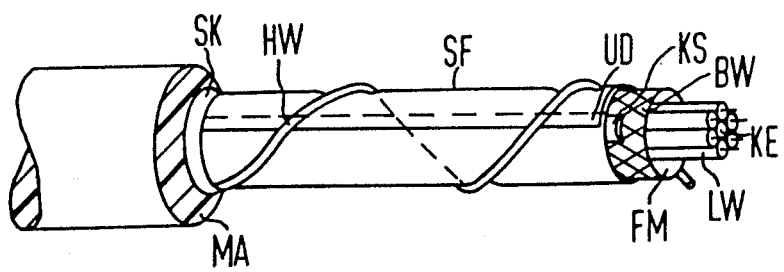
FIG. 2 is a side view of the cable with portions broken away to show various layers of the structure.
Figure 3:
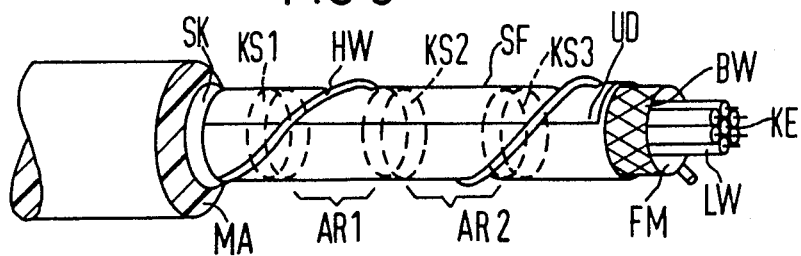
FIG. 3 is a side view of an embodiment of the cable with portions broken away to show an embodiment in the placement of the adhesive on an inner surface portion of the barrier film or layer.

The confining or barrier film SF is pressed down by a retaining helix HW which, as illustrated in FIGS. 2 and 3, is a helical extending element that is applied with a long lay. The depth of the impression of the helix thereby expediently corresponds to approximately the diameter of the element forming the retaining helix. In order to also guarantee sufficient longitudinal tightness between the outer sheath MA and the barrier film SF, the barrier film SF is coated on an outside surface with a meltable adhesive layer SK. Since the entire outside surface is fully closed or covered by the meltable adhesive layer SK, no longitudinal gaps or the like arise in the area between the barrier film SF and the outer sheath MA.

An arbitrary combination of optical waveguides can be provided to form the actual cable core. It is assumed in the present example that six filled optical waveguide elements or leads LW are present and are stranded on a non-yielding and non-crushable core KE. However, it is also possible to form the cable core without the core KE and to provide a larger or respectively smaller number of optical waveguide elements.

When the retaining helix HW consists of a saturatable yarn, for example, a yarn sold under the trademark "KEVLAR", then the meltable adhesive layer SK which is preferably applied gap-free also penetrates into the inside of the retaining helix HK. This provides the advantage of preventing the retaining helix from in turn forming a guidance for lateral penetration of water if damage occurs to the outer sheath MA. On the other hand, the retaining helix HW should be as thin as possible and of a temperature-stable material as possible in order to simplify the manufacturing process. Thus, it can also be designed as a thin, yield-proof flat band.

The overlap location in the area UD should amount to a range of approximately 10 to 40% of the circumference of the barrier film SF. A seal can be effected in this area by means of an adhesive strip being introduced between the two overlapping edges or portions of the barrier film SF. However, the adhesive can also be a component of the outer protective coating on the film.

The manufacturing process for the cable of the type illustrated in FIGS. 1 and 2 advantageously follows the following sequence. The individual optical waveguide lead or elements LW and if need be the core KE are taken from appropriate supply reels and are stranded together to form the cable core or conductor bundle. Subsequently, the conductor bundle or cable core formed in this manner is conducted through a saturating means and is provided with a viscous filling compound FM. An armor layer BW preferably consisting of stranded yarns, for example, yarn sold under the trademark "KEVLAR" is applied onto the core and likewise saturated. Then the melting adhesive strip is applied to a clean portion of the armored layer BW and the protective film SF consisting of material running longitudinally is then wound around the filled cable core and held in an overlapping relationship. The retaining helix HW is applied by means of a retaining helix spinner. Subsequently, the outside of the barrier film SF is coated with a meltable adhesive SK by an additional following feeder which is constructed so that as cylindrical as possible a structure will occur after the application of the adhesive layer. This can occur in a simple manner by means of employing a correspondingly-shaped circular stripper. After applying the adhesive layer SK, the outer sheath MA is applied in a known manner by means of an extruder.

The protective film SF preferably consists of an insulating, non-metallic material. In addition, the sheath MA is expediently designed without non-yielding auxiliary elements because the internally disposed armor BW suffices for improving the mechanical properties. The adhesive layer KS can be designed as an adhesive film or it can also consist of a melting adhesive. As mentioned hereinabove, it can be applied as spaced dots or points on the armor layer BW. Also, the adhesive material can be applied as spaced annular-shaped strips or rings KS1, KS2 and KS3 (see FIG. 3). It should be noted that when applied as dots or annular strips, the spacing between adjacent dots should be a whole multiple of the length of the layer of the yarn forming the armor layer BW. Thus, as illustrated in FIG. 3 and mentioned above, the spacing between the annular ring or strips KS1, KS2 and KS3 leaves large areas AR1, AR2 of the inner surface of the film SF which are free of adhesive material and are free of any connection to the core or armor layer BW.

Although various minor modifications may be suggested by those versed in the art, it should be understood that we wish to embody within the scope of the patent granted hereon, all such modifications as reasonably and properly come within the scope of our contribution to the art.

We claim:

1. In a cable, particularly an optical waveguide cable, having a cable core with a filling compound to produce longitudinal tightness, a barrier film surrounding the cable core and an outer sheath surrounding the barrier film, the improvements comprising an armor layer being composed of stranded material being interposed between the cable core and the barrier film and an adhesive material being disposed on an inner surface of the barrier film only in some sub-areas of the inner surface to form an adhesion between the armor layer and the barrier film only in the sub-areas while the remaining areas of the inner surface are free of the adhesive material and a connection to the armor layer.

2. In a cable according to claim 1, wherein the sub-areas containing the adhesive material are in the form of longitudinally extending strips so that the adhesive forms a longitudinally extending strip layer.

3. In a cable according to claim 1, wherein the sub-areas containing the adhesive material are distributed punctiform.

4. In a cable according to claim 1, wherein the adhesive material and the sub-areas are disposed as annularly-shaped strips at axially spaced intervals.

5. In a cable according to claim 1, wherein the stranded material of the armor layer has a length of lay and the sub-areas and adhesive material comprise annular strips having a spacing which amounts to a whole multiple of the length of lay.

6. In a cable according to claim 1, wherein the stranded material of the armor layer has a length of lay and wherein the adhesive material in the sub-areas is distributed punctiform at an interval along the length of the cable with the interval being a whole multiple of the length of lay.

7. In a cable according to claim 1, wherein the barrier film has a longitudinally extending seam of overlapping edges and the cable further includes a retaining element of helical configuration applied on the barrier film in the direction of the overlap of the edges.

8. In a cable according to claim 7, wherein the retaining element consists of a thin, absorbent, temperature-stable material.

9. In a cable according to claim 8, which includes a layer of meltable adhesive applied between the outer surface of the barrier film and the inside surface of the outer sheath, said adhesive impregnating the retaining element.

10. In a cable according to claim 1, wherein the barrier film consists of a non-conductive material.

11. In a cable according to claim 7, wherein the sub-areas and the adhesive material extend in a longitudinal strip for securing a portion of the barrier film to the armor layer.

12. In a cable according to claim 11, which includes a layer of meltable adhesive introduced between the outer surface of the barrier film and the outer sheath.

13. In a cable according to claim 7, wherein the stranded material of the armored layer has a length of lay and the material and sub-areas of the barrier film having a punctiform distribution at an interval which is a whole multiple of the length of lay so that the barrier film is connected at spaced points to the armored layer.

14. In a cable according to claim 7, which includes a meltable adhesive layer being disposed between the outer surface of the barrier film and the outer sheath for securing the film to the outer sheath.

15. In a cable according to claim 7, wherein the stranded material of the armored layer has a length of lay and wherein the adhesive material and sub-areas are annularly-shaped areas at intervals along the length of the cable with the intervals being whole multiples of the length of lay of the material for the armored layer.

16. In a cable according to claim 15, which further includes a meltable adhesive layer being disposed between the outer surface of the barrier film and the inner surface of the outer sheath for securing the outer sheath onto the barrier layer.

17. In a cable according to claim 7, which includes a gap-free layer of meltable adhesive being interposed between the outer surface of the barrier film and the inside surface of the outer sheath for securing the outer sheath to the barrier film.

* * * * *